United States Patent [19]

Hubeny

[11] 3,806,857

[45] Apr. 23, 1974

[54] TEMPORARY TERMINAL JUMPER AND COVER ASSEMBLY FOR OUTDOOR METER CABINETS

[76] Inventor: Jerry A. Hubeny, 2229 S. Elmwood Ave., Berwyn, Ill. 60402

[22] Filed: June 5, 1972

[21] Appl. No.: 259,496

[52] U.S. Cl.............. 339/19, 339/198 M, 317/107
[51] Int. Cl............................................ H01r 31/08
[58] Field of Search........ 339/19, 32 M, 36, 198 M, 339/217 R, 222; 317/104, 105, 106, 107, 108, 109, 110, 111; 200/51.1

[56] References Cited
UNITED STATES PATENTS

| | | |
|---|---|---|
| 2,858,372 | 10/1958 | Kaufman................................ 339/19 |
| 3,029,322 | 4/1962 | Waldrob............................ 200/51.1 |
| 2,126,602 | 8/1938 | Bakke.................................. 317/107 |
| 2,184,840 | 12/1939 | Johansson et al.................... 317/107 |

Primary Examiner—Bobby R. Gay
Assistant Examiner—Robert A. Hafer
Attorney, Agent, or Firm—Hill, Sherman, Meroni, Gross & Simpson

[57] ABSTRACT

A temporary cover for the meter opening in an outdoor electric meter cabinet for protection against the elements and accidental contact with live terminals pending installation of the meter. The cover carries jumper means to connect the terminals in the cabinet to provide temporary current for the benefit of workers inside the building; and the cover is of waterproof material and easily attached to the cabinet lid.

8 Claims, 7 Drawing Figures

3,806,857

TEMPORARY TERMINAL JUMPER AND COVER ASSEMBLY FOR OUTDOOR METER CABINETS

BRIEF SUMMARY OF THE INVENTION

It is common practice in connection with residences as well as other buildings to install a meter cabinet on the outside of the building, whereby the meter reader may ascertain how much electric power has been used within that building, without the need of entering the building. The cabinet contains spring biased terminals into which blades carried by a meter are ultimately plugged. The cabinet has a removable lid having an opening therein through which the meter extends after being plugged into the terminals. The cabinet and its contents are constructed in accordance with power company specifications, but must be installed by the contractor doing the wiring. Jumper connections must be utilized to obtain current for the workers within the building during installation and the meter opening must be covered for protection against the elements and accidents pending the arrival of the meter which is installed by the power company sometime after the cabinet has been mounted in place. The meter carries four projecting blades each of which is pressed into the groove between adjacent cabinet contacts which are spring biased to grip the meter blade. Previous to meter installation, to provide temporary current for the workers in the building, jumper wires have been jammed between the cabinet contacts, frequently carelessly, and frequently the jumper wires were of such size as to over-spread the contact members ultimately resulting in poor contact when the meter is installed. Such procedure was also somewhat dangerous to the electrician. Further, ofttimes a cover, made of pasteboard or equivalent materials, for the meter opening in the cabinet lid was furnished by the power companies. However, they were not satisfactory especially in rainy or snowy weather, became warped and permitted leakage into the cabinet.

The instant invention effectively solves the above problems in the provision of a meter opening cover in the form of a sheet of weather-proof material. Attached to the underside of that cover is a pair of elongated connection blades to act as jumper means for temporary current, and those blades are the same thickness as the meter blades whereby there is no injury to the cabinet terminals and less danger to the operator because of the simple expedient of just pressing the cover into position. The cover is preferably connected to the lid of the cabinet and may even be cemented to the inside of the cabinet cover from which it could be easily removed with a screwdriver or the like. Consequently, with the use of the instant cover and jumper assembly, the contents of the meter cabinet are fully protected against the weather as well as accidents, and the cabinet terminals are jumped or connected in a simple and easy manner without danger to those terminals. The assembly can be made quite economically both as to cost as well as usage.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DETAILED DESCRIPTION

Figure 2:
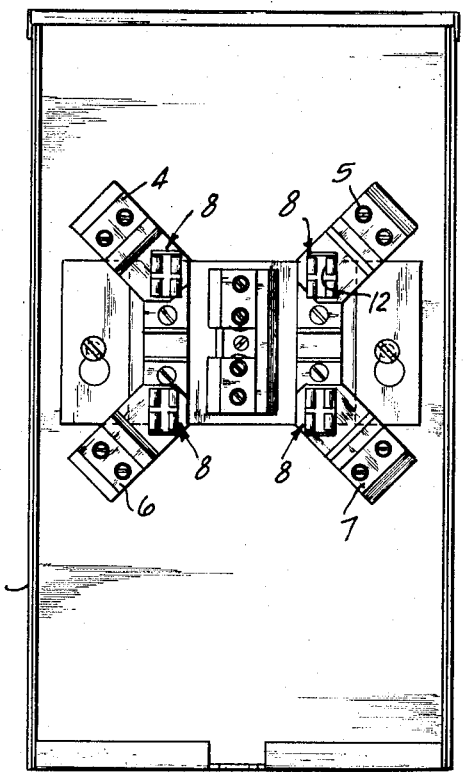
FIG. 2 is a plan view looking into the interior of the cabinet with the cover removed.
Figure 3:
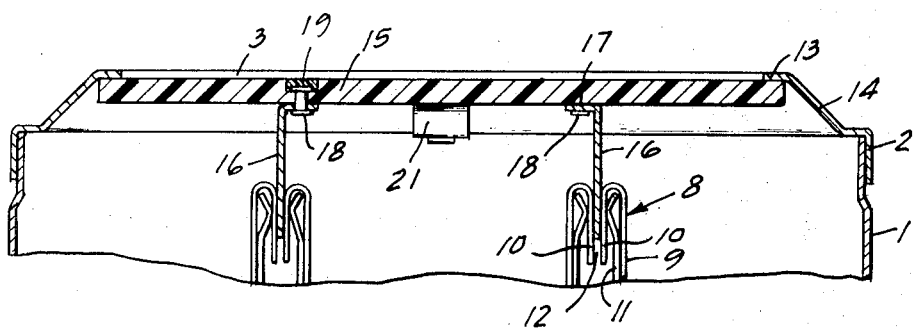
FIG. 3 is an enlarged vertical sectional view taken substantially as indicated by the line III—III of FIG. 1.

The instant invention is associated with a meter cabinet 1 having a removable lid 2 which is mounted on the outside wall of a building in a known manner. The lid 2 is provided with an opening 3 therein through which the meter extends when mounted in position. As best seen in FIG. 2, the cabinet 1 contains therein a pair of terminals 4–5 to which the power line conductors may be connected, and a pair of terminals 6 and 7 to which the building conductors may be connected. Upstanding from each of these terminals is a terminal connection for the meter which has four blades (not shown) projecting therefrom for engaging the four respective terminals so that current from the power lines will pass through the meter and thence into the building conductors. Each of the meter connections 8 comprises a U-shaped contacting element 9 with the upper portions of the legs of the U turned downwardly as seen at 10 in FIG. 3. Inside the contact element 9 is a U-shaped spring member 11 extending into the turned down portions of the U-shaped contact member 9 and which bias the turned down portions 10—10 toward each other leaving a groove or slot 12 therebetween into which a blade extending from the meter is pressed. However, before the installation of the meter, it is necessary to provide temporary power to the workers inside the building. As above explained, heretofore that was usually done by jamming a wire into a meter terminal connection 8 on a power line terminal and the other end of the wire was jammed into the meter connection 8 on the opposite building line terminal. This was dangerous to the operator, and also the wires were most frequently oversized, carelessly handled, and as a result caused a greater spreading of the portions 10—10 of the contact member 9, thus enlarging the groove 12 so there was a resultant poor contact with the meter blades.

It will also be noted that the lid 2 of the meter cabinet is provided with an annular flange 13 surrounding the opening 3 offset from the main portion of the lid by an upwardly sloping elevation 14.

Since the terminals inside the meter cabinet must be adequately and effectively protected from the weather until the meter is installed, the instant invention embodies a a generally disk-like sheet cover 15 of weatherproof material such as treated compressed wood fibers, a suitable plastic, or other material suitable for the purpose that is completely weatherproof and will not warp. Secured to the inner face of the cover 15 are a pair of spaced jumper strips 16—16, each jumper strip having a flange 17 at the top and securing means 18 pass through that flange. Each jumper strip is of a length to bridge the distance between a meter terminal 8 on the main terminal 5 and the meter terminal 8 on the main terminal 7, while the other jumper strip connects the meter terminal 8 on the main terminal 4 with the meter terminal 8 on the other main terminal 6. The jumper strips 16 are each of the same thickness as the connecting blades on the meter, and therefore may be pressed into the meter terminals 8 without distorting or over-separating the spring biased contact members 9, thus assuring tight and effective contact with the blades extending from a meter.

Fastening means 18 for the jumper strip 16 may be in the form of a rivet, and the aperture through the cover 15 is enlarged at the top to receive the rivet head and above the rivet head the aperture is covered with an insulating compound 19 which conceals the rivet head and prevents any part from becoming short-circuited by way of water running over the outer face of the cover. Also preferably arrows 20 are drawn through the line of insulation spots 19 to denote in which position the cover should be placed so the jumper strips will enter the meter terminals accurately.

In use, sometimes the cover 15 may be engaged with the meter terminals and then the lid 2 of the cabinet placed in position with the aforesaid annular flange 13 resting on the bounding margin of the cover. In this instance, reliance is had upon the engagement of the contact strips 16—16 with the meter terminals to maintain the cover against the inside face of the flange 13.

Figure 4:
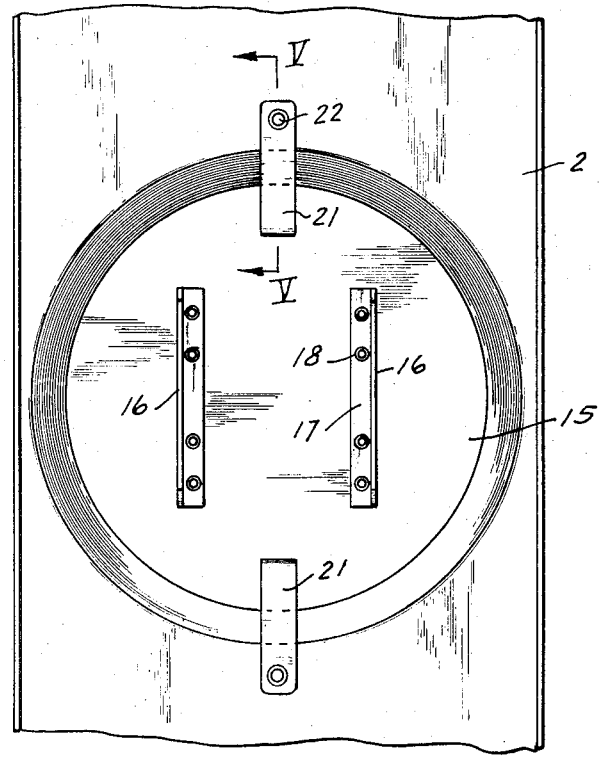
FIG. 4 is a bottom plan view, enlarged, of the cabinet lid and the cover for the meter opening attached thereto.
Figure 5:
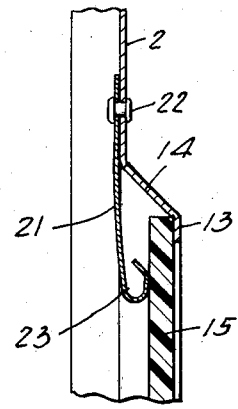
FIG. 5 is an enlarged fragmentary sectional view taken substantially as indicated by the line V—V of FIG. 4.

However, in many cases a more positive holding of the cover against the flange 13 may be desired. To this end, a pair of opposed spring metal leaves 21—21 may be attached to the lid 2, each at one end by a rivet or the equivalent 22, the other end of the leaf being turned as at 23 for pressure contact against the inside face of the cover 15. When the cover is connected to the lid in this manner, it is a simple expedient to rotate the spring leaves into the position seen in FIG. 4 in engagement with the cover 15. To remove the cover, it is a simple expedient to rotate the spring leaves sufficiently for the curled end 23 to rest directly against the inside face of the cabinet lid 2. When the cover is mounted, as seen in FIG. 4, it is then a simple expedient to place the lid 2 back on the cabinet 1 and the jumper strips 16—16 will enter the respective terminals to provide temporary current, while awaiting installation of the meter. It will also be noted that no damage is done to the meter terminals, the cover is positively held tightly against the inside face of the flange 13 and the terminals within the cabinet 1 are positively protected against the weather. The cover 15 may be acquired separately or it might be purchased as part of the meter cabinet, and in the latter case the cover could be cemented to the inside of the lid 2 against the flange 13 in a manner such that it could be released easily with a knife blade. In either case, the cover is safe to use, and economical to manufacture and use, and it is capable of repeated use many times.

Figure 1:
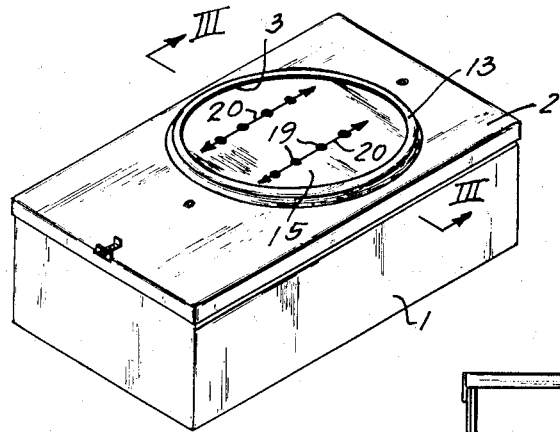
FIG. 1 is an isometric view of a meter cabinet having the meter opening closed by a cover and jumper assembly embodying the principles of the instant invention, showing the same in operative position.
Figure 7:
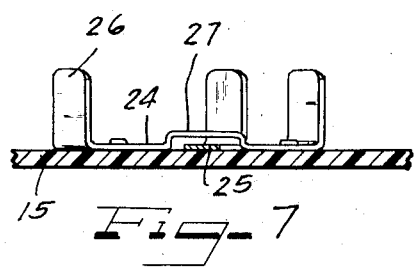
FIG. 7 is a vertical sectional view taken substantially as indicated by the line VII—VII of FIG. 6.
Figure 6:
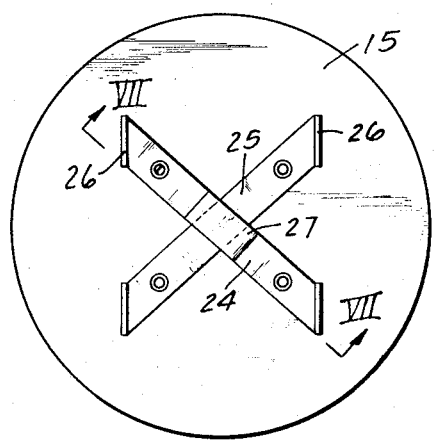
FIG. 6 is a bottom plan view of a cover and jumper assembly embodying principles of the instant invention but showing a change in the mounting of the jumper means.

In FIGS. 6 and 7, I have shown a modified form of the application of jumper strips to the inside face of the cover 15. In this instance, jumper strips 24 and 25 are arranged in the form of an X, each strip having an inwardly bent end portion 26 to engage one of the meter terminals 8. From the showing in FIG. 7 it will be seen that the strip 24 has a central portion elevated as at 27 so there will be no contact between the two strips. With this arrangement, it will be noted that it is impossible to accidentally short circuit the power lines engaged with main terminals 4 and 5. Should any two of the contact blades 26 contact or enter the meter terminals on main terminals 4 and 5, current will flow from main terminal 4 to main terminal 7 and from main terminal 5 to main terminal 6 when the cover is ultimately positioned but the power line terminals cannot establish a short circuit. This form of the invention may be used in the same manner as above described, and if so desired similar indicia to the arrows 20—20 of FIG. 1 may be provided on the opposite cover face.

I claim as my invention:

1. In a meter cabinet having an opening with a margin thereabout, and containing terminal connections therein for electrically connecting an electric meter to power conductors and building conductors:

a temporary cover of a generally disk-like sheet of weatherproof non-conductive material having a boundary margin engaging the cabinet margin about said opening and completely sealing said opening; and jumper means carried by the cover on its inner face and projecting therefrom into engagement with said terminal connections to establish an electrical circuit between the power conductors and the building conductors and provide temporary power for workers in a building while awaiting installation of a meter with the cabinet.

2. The cabinet of claim 1, wherein said jumper means are strips of the same thickness as the contact blades on a standard electric meter and cannot injure the meter terminal connections in the cabinet.

3. The cabinet of claim 1, wherein said sheet is a dish of plastic material.

4. The cabinet of claim 1, wherein said jumper means are so arranged that the power conductors cannot accidentally be short-circuited.

5. The cabinet of claim 1, including indicia on the outer face of the cover to direct proper positioning thereof for the jumper means to engage the meter terminal connections.

6. The cabinet of claim 1, wherein said jumper means include spaced conductive strips extending inwardly from the inner face of said cover sheet, and each of said strips being of a length sufficient to bridge a pair of meter terminal connections on one side of a power line.

7. A temporary cover for the meter opening in a meter cabinet containing terminal connections for power conductors, building conductors, and an electric meter, wherein the improvements comprises said cover being a sheet of weatherproof non-conductive material, jumper means carried by the cover on its inner face to establish circuit connections through the meter terminals and provide temporary power for the workers in a building while awaiting installation of a meter, rivets joining said jumper means to said cover sheet, said rivets having their heads embedded in said cover sheet, and insulation material concealing and overlying the heads of said rivets on the outer face of said cover.

8. A temporary cover for the meter opening in a meter cabinet containing terminal connections for power conductors, building conductors, and an electric meter, wherein the improvement comprises said cover being a sheet of weatherproof non-conductive material, jumper means carried by the cover on its inner face to establish circuit connections through the meter terminals and provide temporary power for the workers in a building while awaiting installation of a meter, said jumper means include a pair of conductive strips arranged in an X-formation, the ends of each strip being turned inwardly to provide a blade-like extension of a width to fit one of the meter terminals in the cabinet, and one of said strips being centrally offset to avoid contact with the other strip.

* * * * *